(No Model.)

G. HENDERSON.
APPARATUS FOR DRAWING OFF GRAIN FROM SILOS.

No. 413,720. Patented Oct. 29, 1889.

Witnesses.
Thomas Dunkerley
Thos. A. Foulkes.

Inventor.
George Henderson
by Ferdinand Bosshardt
Attorney.

UNITED STATES PATENT OFFICE.

GEORGE HENDERSON, OF LIVERPOOL, COUNTY OF LANCASTER, ENGLAND.

APPARATUS FOR DRAWING OFF GRAIN FROM SILOS.

SPECIFICATION forming part of Letters Patent No. 413,720, dated October 29, 1889.

Application filed February 29, 1888. Serial No. 265,763. (No model.) Patented in England March 3, 1886, No. 3,031.

*To all whom it may concern:*

Be it known that I, GEORGE HENDERSON, a subject of the Queen of Great Britain, residing at Liverpool, in the county of Lancaster, Kingdom of Great Britain, have invented a new and useful Apparatus for Drawing off Grain from Silos or other Like Places, (for which I have obtained a patent in Great Britain, No. 3,031, bearing date March 3, A. D. 1886,) of which the following is a specification.

My invention relates to improvements in apparatus for drawing off grain from silos or other like places, and has for its object to provide means whereby the grain can be drawn off as uniform in mixture as it went in. I attain this object by the apparatus illustrated in the accompanying sheet of drawings, in which—

Figure 1:
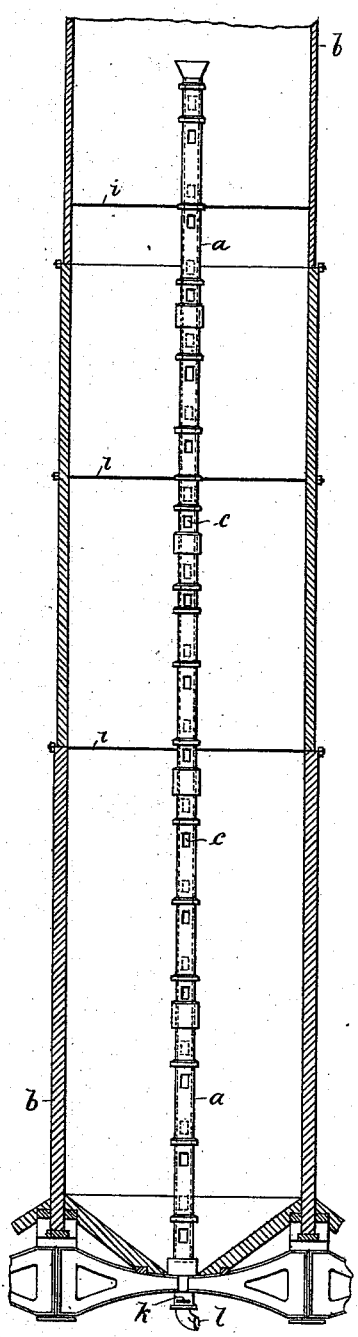
Figure 2:
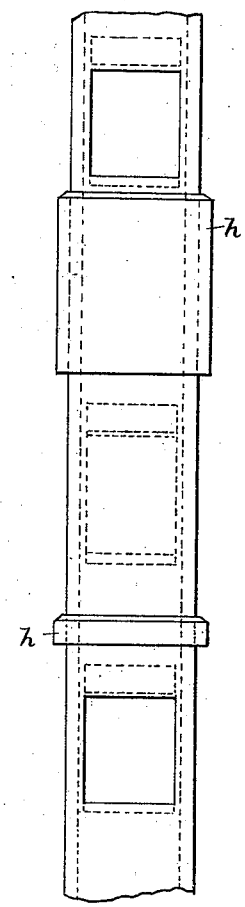
Figure 3:
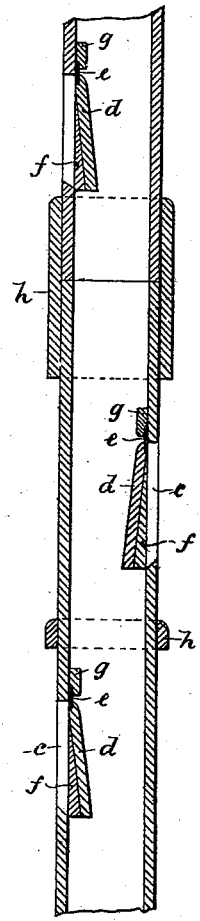
Figure 4:
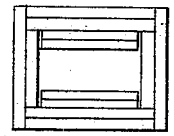

Figure 1 is a sectional elevation of a silo with my improvement attached; Fig. 2, a part elevation; Fig. 3, a part section, and Fig. 4 a plan of my improvements detached.

Similar letters refer to similar parts throughout the several figures.

In drawing off grain from silos or like places the heavier grain has a tendency to fall to the bottom and the lighter to remain at the top of the body of grain, the consequence being that, though the grain being uniform in mixture from top to bottom at the beginning, the first two-thirds of the grain run out will be superior in quality to the last third, and this latter will rapidly deteriorate toward the end.

Now, my invention consists in drawing the grain off from close to the surface-level of the body of grain instead of from the bottom. To effect this and to work automatically, I arrange at any convenient part in the silo $b$ a pipe or pipes or hollow column or columns $a$, extending from the top to the bottom, but preferably only one passing through the center of the silo $b$. This pipe or hollow column $a$ throughout its length I form at short intervals with openings $c$. These openings $c$, for drawing off better classes of grain, I provide with valves $d$, which are attached to the said pipe or column $a$ by means of a hinge $e$, which valve $d$ prevents the passage of grain through any but the opening $c$, just below the surface-level of the body of grain in the silo $b$. The valve $d$ (shown in the drawings) is a wooden one attached to the pipe or hollow column $a$ by means of a leather hinge. However, metal or other valves lying flat against the side in a vertical position may be employed, but the valve $d$ must be longer than the opening $c$, and the end thereof bent backward somewhat below the opening $c$, or have some projection on the back to catch a little of the weight of the grain. However, I prefer wooden valves $d$, as shown in Fig. 3, with a wedge-shaped backing $f$, and a wooden guard $g$ above, holding the hinge $e$ and projecting out as far as the top of the valve projects to take off the strain of the grain. As in any case the grain exerts a great strain on the apparatus, I strengthen the pipe or hollow column $a$ at intervals and at joints by strengthening-pieces $h$, and also stay it to the sides by iron rods $i$.

In filling the silo $b$, when valves $d$ are used, I first fill the pipe or hollow column $a$. This is a most important point, as by this means only (when employing valves $d$) can the same be made to work automatically without trouble. In drawing off grain the usual main drawing-off valve $k$, opening into the bottom of the tube $l$, is opened. The grain gradually falls in the pipe or hollow column $a$, and as the surface of the grain in the pipe or hollow column $a$ falls below each opening $c$ and its valve $d$ in succession the grain outside the pipe or hollow column $a$ is caused to enter the opening $c$ nearest to the surface of the grain, and when valves $d$ are used opens the same and passes into the pipe or hollow column $a$, until the lowest of the openings $c$ or valves $d$ is reached. The openings $c$ are formed with beveled lower edges, so as to prevent the grain lodging on them. It will be obvious that in this system of openings C automatic valves can be used with a pipe or hollow column $a$ in any other position than the center, and that the pipe or hollow column $a$ can be rectangular, polygonal, or cylindrical, but I prefer the first-mentioned shape. The area of the drawing-off valve $k$ must be considerably less than that of the pipe or hollow column $a$, and the openings $c$ and automatic valves $d$ should be large enough to individually supply the full requirements of the drawing-off valve $k$.

Having now particularly described and ascertained the nature of this invention and in what manner the same is to be performed, I declare that what I claim is—

1. In apparatus for drawing off grain from silos or other like places, the combination of the silo $b$ with a pipe or hollow column $a$, extending from or near the top of a single silo $b$ to the bottom thereof, and having openings $c$ formed on its entire length at suitable intervals, through which the grain enters the pipe or hollow column $a$ automatically, and is drawn off from the silo $b$, substantially as and for the purpose specified.

2. The combination, with a silo, of a pipe or hollow column extending from a higher to a lower point within the silo and having apertures at different heights, and inwardly-opening valves for opening or closing said apertures, substantially as set forth.

3. The combination, with a silo, of a pipe or hollow column extending from a higher to a lower point within the same and having apertures at different heights opening into the same silo, and valves situated at said apertures for preventing or permitting the ingress of grain, substantially as set forth.

GEORGE HENDERSON.

Witnesses:
FERDINAND BOSSHARDT,
THOS. A. FOULKES.